US006973074B1

(12) United States Patent
Maranhao

(10) Patent No.: US 6,973,074 B1
(45) Date of Patent: Dec. 6, 2005

(54) TRANSMISSION OF DIGITIZED VOICE, VOICEBAND DATA, AND PHONE SIGNALING OVER A PRIORITY-BASED LOCAL AREA NETWORK WITHOUT THE USE OF VOICE OVER IP TECHNIQUES OR A SEPARATE VOICE-DEDICATED NETWORK

(75) Inventor: Marcus Maranhao, Irvine, CA (US)

(73) Assignee: Cisco Technology, Inc., San Jose, CA (US)

(*) Notice: Subject to any disclaimer, the term of this patent is extended or adjusted under 35 U.S.C. 154(b) by 724 days.

(21) Appl. No.: 09/608,477

(22) Filed: Jun. 30, 2000

(51) Int. Cl.$^7$ .......................... H04L 12/66; H04L 12/56
(52) U.S. Cl. .................................. 370/352; 370/395.6
(58) Field of Search ................................ 370/351–356, 370/389–402; 379/395.01; 725/111

(56) References Cited

U.S. PATENT DOCUMENTS

| 5,525,581 | A  | * | 6/1996  | Hayashi ...................... 725/111 |
| 6,453,040 | B1 | * | 9/2002  | Burke et al. ............ 379/395.01 |
| 6,456,633 | B1 | * | 9/2002  | Chen .......................... 370/352 |
| 6,522,647 | B1 | * | 2/2003  | Czajkowski et al. ........ 370/356 |
| 6,563,816 | B1 | * | 5/2003  | Nodoushani et al. ....... 370/352 |
| 6,580,710 | B1 | * | 6/2003  | Bowen et al. .............. 370/353 |
| 6,647,117 | B1 | * | 11/2003 | Wallace et al. ........ 379/395.01 |
| 6,760,309 | B1 | * | 7/2004  | Rochberger et al. ..... 370/395.4 |
| 2001/0012293 | A1 | * | 8/2001  | Petersen et al. ............ 370/389 |
| 2002/0006137 | A1 | * | 1/2002  | Rabenko et al. ............ 370/352 |

OTHER PUBLICATIONS

U.S. Appl. No. 60/217932, Rabenko, System and method for delivering multiple voice circuits on a single wire pair, pp. 1-21, 114-315 and Figs 1-52.*

U.S. Appl. No. 60/203057, Rabenko, System and method for delivering multiple voice circuits on a single wire pair, pp. 1-21, 114-308 and Figs 1-52.*

Frank, Edward H., et al., "Connecting The Home With A Phone Line Network Chip Set", IEEE MICRO, Mar.-Arp. 2000, pp. 1-12.

* cited by examiner

*Primary Examiner*—Steven Nguyen

(74) *Attorney, Agent, or Firm*—Hickman Palermo Truong & Becker, LLP

(57) ABSTRACT

A method and apparatus for transmitting voice, voiceband data and phone signaling is described. Analog voice, voiceband data and phone signaling are converted into their corresponding digitized version. The digital voice, digitized voiceband data, and digitized phone signaling may be transported as AAL2 packets via an LAN that follows an LAN protocol that supports levels of transmission priority. The LAN protocol may be, for example, HomePNA. The packets may be formatted in a manner similar to other networking protocols for transmitting digitized voice, digitized voiceband data and digitized phone signaling, such as AAL2. The use of AAL2 packets instead of voice over IP packets and techniques allows use of simpler less costly components and a straightforward interworking at the residential gateway device connected to the WAN via DSL using the emerging loop emulation service. Furthermore, the use of a priority-based network provides an alternative to the use of a logically separate network dedicated to transmitting digitized voice, digitized voiceband data and digitized phone signaling, and hence the higher costs associated with the logically separate network.

10 Claims, 3 Drawing Sheets

TRANSMISSION OF DIGITIZED VOICE, VOICEBAND DATA, AND PHONE SIGNALING OVER A PRIORITY-BASED LOCAL AREA NETWORK WITHOUT THE USE OF VOICE OVER IP TECHNIQUES OR A SEPARATE VOICE-DEDICATED NETWORK

FIELD OF THE INVENTION

The present invention relates to the field of networking, and in particular, the transmission of digitized voice, voiceband data and phone signaling over a priority-based local area network.

BACKGROUND OF THE INVENTION

Home Networking

Use of local area networks ("LAN"s) in homes ("home networking") is beginning to proliferate. There are a variety of home networking mechanisms that have been or are being developed that may use various transmission media such as power lines, wireless media, and standard phone lines inside residences or other dwellings, herein referred to as inside wiring. Phone line based home networking, which uses the phone line inside wiring, has been the most popular scheme so far. One set of LAN protocols that has been developed for phone line based networks is referred to as HomePNA. HomePNA is an acronym based on the name Home Phoneline Networking Alliance, the name for the industry group that generated the specifications for home networking using phone line inside wiring. This organization also uses the acronym HPNA. Specifications that have been approved include a specification for a 10 Mb/s packet based network protocol, as specified in "Interface Specification for Home-PNA 2.0", Home Phoneline Networking Alliance, Inc., Dec. 1, 1999, herein referred to as *HomePNA* 2.0 and incorporated by reference. The HomePNA group develops the specifications for the physical layer and has not concerned itself with defining applications running on top of the HomePNA home network. Current applications making use of HomePNA have been mostly non-real time data applications.

Because home phone line based networking is by far the most popular one, it is used herein to illustrate the present invention. However, this use is not intended to constrain the invention to only home phone line based networks. For example, the present invention may be used with a powerline based home networks, if such home networks are defined to incorporate a priority mechanism.

Digital Subscriber Lines (DSL)

Another development that is also becoming widespread is the use of phone lines to transmit high speed digital signals for the purpose of providing connection to a wide area networks ("WAN"s), such as the Internet, at rates much higher than what is available nowadays with conventional analog modems. The technology to achieve this over phone lines is referred to as Digital Subscriber Line (DSL). The DSL standard has been developed by the ITU-T, an international standards organization, and concerns itself with the physical layer aspects and the transport of asynchronous transfer mode ("ATM") cells (e.g. small 53 byte packets) over the DSL line. Once again, most current uses of DSL lines are for data applications, mostly for access to the Internet. Recently, however, there has been a movement to also use DSL lines to transmit digitized voice, voiceband data and phone signaling. Voiceband data refers to data information (e.g., computer data transmitted by a modem, or the information/data in a page transmitted by a fax) transmitted over the voiceband frequencies (typically 300 Hz to 3400 Hz). Technology for transmitting digitized voice, voiceband data and phone signaling using DSL is known in the industry as "Derived Voice", and standards for using DSL lines to emulate the phone line (commonly referred in the telecommunication industry as the "loop") interface are being developed. A standard referred to as "Loop Emulation Service" is being developed by industry groups whose objective is to further the application of DSL and ATM. These groups include the DSL Forum (See DSL Forum, document WT-043 Main Body and Annex A, "Requirements for voice over DSL", May 31, 2000, herein incorporated by reference and referred to as *"Requirements for voice over DSL"*), and the ATM Forum (See ATM Forum, ATM Forum document FB-VMOA-0145.000, "Loop Emulation Service Using AAL2", June 2000, herein incorporated by reference and referred to as *"ATM Forum document FB-VMOA-0145.000"*). The "Loop Emulation Service" standard is making use of ATM Adaptation Layer 2 (AAL2) techniques, also defined by the ITU to transport the digitized voice samples and signaling (See ITU-T Recommendation I.366.2, "AAL Type 2 Service Specific Convergence Sublayer for Trunking", February 1999, herein incorporated by reference and referred to as *"I.366.2"*; ITU-T Recommendation I.363.2, "B-ISDN ATM Adaptation layer specification: Type 2 AAL", September 1997, herein incorporated by reference and referred to as *"I.363.2"*.)

Residential Gateways

The possibility of transmitting different media, such as data and voice to the WAN via a DSL line is driving the emergence of a class of devices, commonly being referred to in the industry as a "residential gateway". The name conveys the idea that this device provides a demarcation, a gateway between the residence and the WAN. Early embodiments of these residential gateways included an interface to an LAN, and later a HomePNA home network, for providing connection to a computer associated with the non-real-time data applications, and locally attached phones, associated with the real-time voice applications. More recently there has been a desire to remove the restriction that the phone be directly attached to the residential gateway, since most people have a number of phones distributed in various locations of their residence. Three approaches have been taken to support remote telephones as part of a residential gateway:

1) use a phone line adapter that converts the conventional phone analog signals into digital signals, which are then transported over a LAN or HomePNA using "voice over IP techniques".

2) use a phone line adapter that converts the conventional phone analog signals into digital signals, which are then transported over a logically separate TDMA based so called "voice LAN", which is in addition to the LAN or HomePNA used for data applications.

3) use a phone line adapter that converts the conventional phone analog signals into digital signals, which are then transported over a wireless LAN to the residential gateway.

All of the previous approaches suffer from higher system costs due to varying factors. The voice over IP approach has higher system cost because the protocol stack involved in voice over IP is significant (requires IP, UDP, RTP, and one of either MGCP, SGCP or H.323) and therefore requires considerable more processing capability, hence cost. MGCP, SGCP or H.323 are industry standards for protocols used for digitized phone signaling information (e.g. on-hook, off-hook status).

The use of a separate Time Division Multiple Access ("TDMA") based "voice LAN" network has higher cost because the development of a second networking technology to be used just for voice requires extra components. Furthermore, implementation of this second network may cause interference in the first home network to start with and/or interference with more advanced DSL technologies being developed.

The wireless approach also has higher system cost because it also implies a separate network for voice purposes; and even if one also used the wireless home networking for non-real time data, the wireless home networking components are still considerably more expensive than wired home networking components.

Based on the foregoing, it is clearly desirable to provide a solution to the above problems which offers a lower system cost than any of the current approaches.

SUMMARY OF THE INVENTION

A method and apparatus for transmitting digitized voice, voiceband and phone signaling over a priority-based home networking is described. According to an aspect of the present invention, analog phone signals are converted into digitized voice, voiceband data and phone signaling. The digital samples are transported as AAL2 packets via an LAN that supports levels of transmission priority. The LAN protocol may be, for example, *HomePNA* 2.0.

The use of AAL2 packets and protocols for voice applications allows a simpler design with less overhead than what can be obtained with voice over IP techniques, thus resulting in a cheaper system cost. The reuse of the HomePNA for the voice traffic avoids the need for a second logically separate home network, as has been the case in some designs, which also reduces the total system cost.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for transmitting digitized voice, voiceband data and phone signaling over a priority-based network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW

A priority-based local area network provides the mechanism to give preference to the transport of voice over data, therefore providing a quality of the voice very close to the approach of using a logically separate network, without the inherent costs of that additional logically separate network. The same "Loop Emulation Service" techniques and methods being used from the residential gateway to the WAN portion, can be extended back to the LAN between the remote telephones and the residential gateway, therefore minimizing overhead in the interworking of different methods and protocols at the residential gateway.

Exemplary Network

Figure 1:
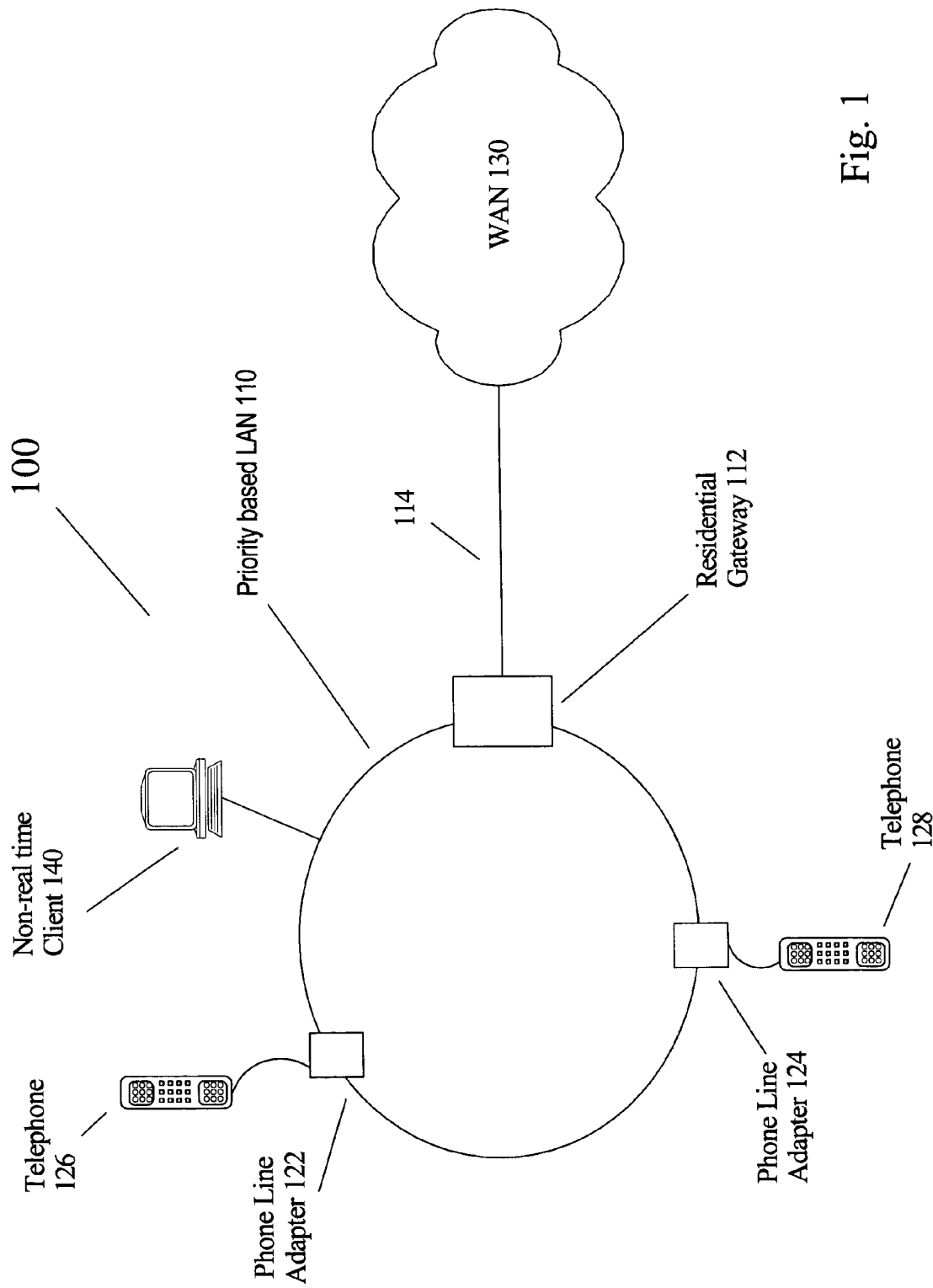
FIG. 1 is a block diagram depicting a network architecture which may be used to implement an embodiment of the present invention.

FIG. 1 is a block diagram depicting an exemplary network 100 which incorporates an embodiment of the present invention. Exemplary network architecture includes priority based LAN 110, which is coupled to a WAN 130, for example the Internet, by means of a Residential Gateway 112, through link 114. Link 114 may be, for example, DSL transporting ATM payloads.

Priority based LAN 110 is a general purpose network that uses a transmission medium in the form of phone line inside wiring. A general purpose network is one that allows for transmission of various types of data, including non-real time data and real-time data. Priority based LAN 110 also follows an LAN protocol that supports levels of transmission priority, such as *HomePNA* 2.0. A LAN protocol that supports levels of transmission priority is a LAN protocol that defines a mechanism that causes an LAN to transmit packets according to a priority. The use of HomePNA is but one example of a priority-based LAN that may be used to implement the present invention. The present invention may be used with any LAN that provides a priority mechanism. Therefore, it is understood, that the present invention is not in any way limited to HomePNA. For example, the present invention may be implemented using a powerline-based LAN, as long as the LAN defined on top of the powerline inside wiring supports levels of transmission priority.

Also coupled to LAN 110 is phone line adaptors 122 and 124, which are themselves coupled to analog telephones 126 and 128, respectively. Telephones 126 and 128 are analog telephones. A phone line adaptor, such as phone line adaptors 122 and 124, is a device that converts analog voice signals, analog voiceband signals and analog phone line signaling into digitized voice, digitized voiceband data and digitized phone signaling that may be transported over a network to a residential gateway. A phone line adaptor also converts digitized voice, digitized voiceband data, and digitized phone signaling into an analog phone signal and analog phone signaling that may be delivered to a conventional analog phone.

Residential gateway 112 is a central hub that receives the packets and retransmits them over link 114 to other devices coupled to LAN 110. Before transmitting packets over link 114 to other devices following other protocols, residential gateway 112 may convert the packets to follow other protocols.

Residential gateway 112 may also receive packets containing digitized voice, digitized voiceband data and digitized phone signaling over link 114, which residential gateway 112 may transmit via LAN 110 to devices connected to LAN 110, such as phone line adaptors 122 and 124. The packets received by residential gateway 112 over the link 114 do not conform to HomePNA. The residential gateway 112 thus further processes the packets before transmitting them via LAN 110 using HomePNA, to phone line adaptors 122 and 124.

Finally, also coupled to LAN 110 is non-real time client 140. Non-real time client 140 is a computer that runs applications that transmit non-real time data over LAN 110. Non-real time client may be a general purpose computer coupled to LAN 110 via a network interface card.

Transmitting Digitized Voice, Voiceband Data, and Phone Signaling

Phone line adaptors 122 and 124 may receive and transmit digitized voice, digitized voiceband data and digitized phone signaling over LAN 110 using HomePNA. For example, phone line adaptor 124 receives analog phone signals from analog telephone 128. Phone line adaptor 124 converts the analog signal into digitized voice, voiceband data, which it encapsulates into packets that are transmitted to residential gateway 112 using a high level of transmission priority, preferably the highest supported by the HomePNA protocol. The level of transmission priority may be controlled by, for example, setting a field in the HomePNA frame header. Further details about how data may be transmitted using levels of transmission priority may be found in the *HomePNA 2.0*.

Phone Line Adaptor

Figure 2:
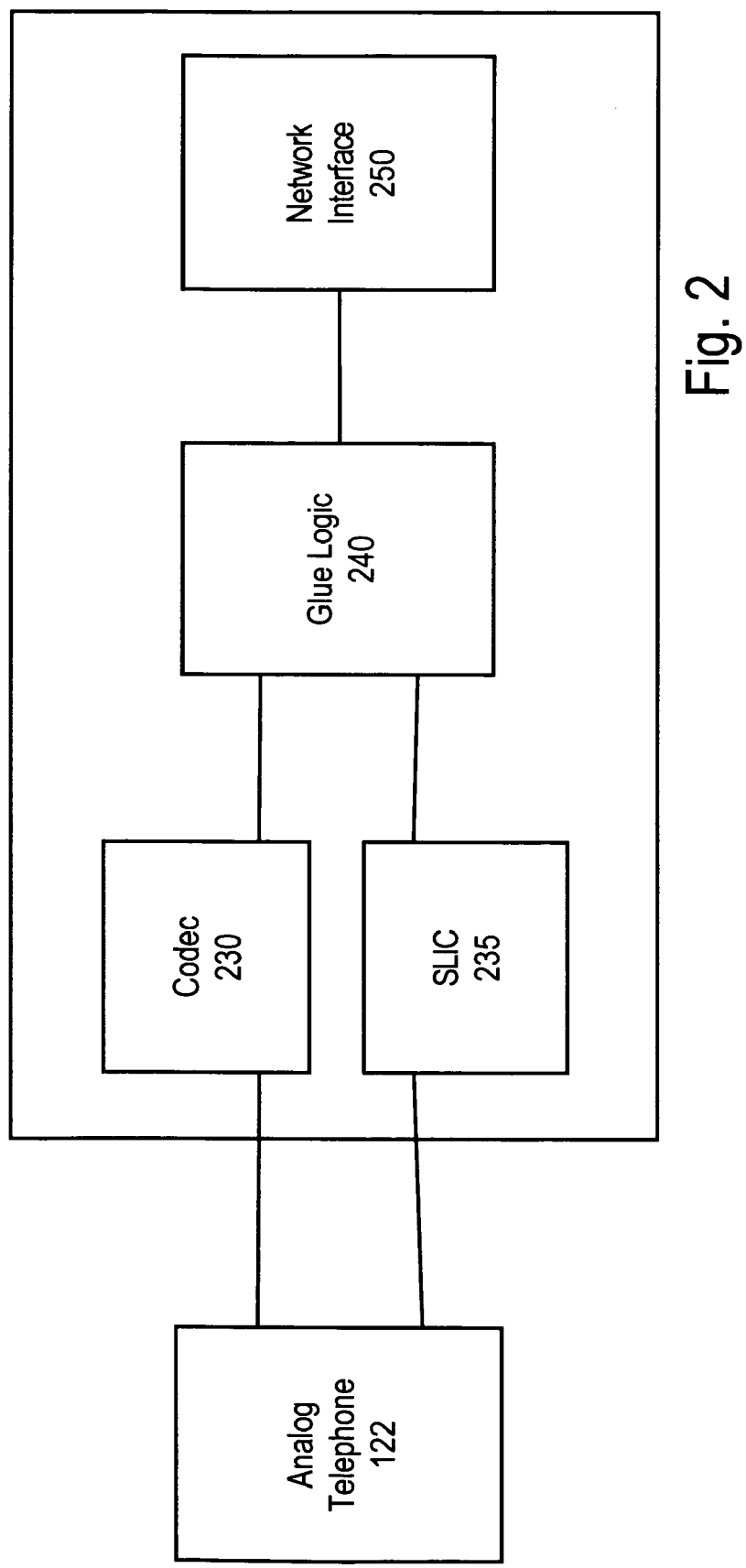
FIG. 2 is a block diagram depicting a phone line adaptor device according to an embodiment of the present invention.

FIG. 2 is a block diagram depicting a phone line adaptor 122 in greater detail. Referring to FIG. 2, phone line adapter 122 is coupled to analog phone 126 via a small length piece of phone line. Phone line adapter 122 includes a Coder/Decoder ("Codec") block 230, Subscriber Line Interface Circuit (SLIC) block 235, "glue" logic block 240, and an Network interface block 250. A Codec block, such as Codec block 230, is a mechanism that converts analog phone signals into binary output, such as digital voice sample data. A Codec block also converts digital voice sample data into analog phone signals. A SLIC block, such as SLIC block 235, is a mechanism that converts analog phone signaling into their corresponding digital indication, and vice-versa.

Network Interface block 250 is a standard component that implements the networking functionality for exchanging data packets and frames over an LAN. An example of such standard components for an HomePNA network is a device such as the BCM4210 by Broadcom Corporation.

"Glue" logic block 240 is a block that encapsulates the digital voice and voiceband data output by the Codec block 230 and digitized phone signaling output by SLIC block 235, into the appropriate packet format for transmission over the LAN through the Network Interface block 250. The "glue" logic block 240 also receives packets from the LAN through the Network Interface block 250 and recovers: a) the contained digital voice and voiceband data which it feeds to the Codec block 230 and b) the digitized phone signaling, which it feeds to the SLIC block 235 for further conversion into analog phonesignaling.

Packet Formats

Phone packets transmitted via an LAN must conform to the protocol used by the network. Accordingly, phone packets transmitted over LAN 110 follow a general format that conforms to the HomePNA specification, from the physical and link layer point of view. From an application point of view, it is necessary to also define a packet format and protocol. To define packet format and protocol, prior art designs used, for example, voice over IP packets and protocols. Voice over IP packets and protocols may be explicitly avoided for the reasons previously cited. Instead, AAL2 may be used. Specifically, for digitized phone samples and phone signaling the combined protocols described in *I*.366.2 and in *I*.363.2 may be used.

The following description and packet format charts illustrate examples of packet formats that may be used if one chooses an AAL2 packet format. The present invention encompasses a wide range of packet formats. The packet format charts below present particular examples of the packet formats that should be considered as illustrative of the present invention, rather than as limiting.

Examples of Packet Formats Using AAL2

The AAL2 CPS-Packet format of section 9.1 of I.363.2 is used. The CPS-Packets are in turn transported as payloads of a CPS-PDU, the format of which is detailed in section 9.2 of I.363.2. Putting together these two, the generic format in the case of AAL2 packets is as shown in the chart below:

Note: In all the charts that follow, the numbers 1 through 8 in the first row, serve to enumerate the bits in a byte, while the numbers 1 through 48 in the rightmost column serve to enumerate the bytes in the packet format.

| 8 | 7 | 6 | 5 | 4 | 3 | 2 | 1 | |
|---|---|---|---|---|---|---|---|---|
| OSF | | | | | | SN | P | 1 |
| value 47 decimal | | | | | | | | |
| CID | | | | | | | | 2 |
| LI | | | | | UUI | | | 3 |
| value 43 (number of bytes-1:from byte 4 to 48) | | | | | | | | |
| UUI (cont) | | | | HEC (CRC-5) | | | | 4 |
| Payload | | | | | | | | 5 |
| | | | | | | | | to |
| | | | | | | | | 48 |

Each phone adapter must be allocated a unique (in the context of a LAN) identification, which is used in the CID field to identify the source/destination of the packet. For common telephones (referred in the industry as POTS phones) the values of CID should be allocated from the range 16–127, as indicated in Table 1 in section 4.4.2 of ATM Forum document FB-VMOA-0145.000. The choice of an adapter identifier (CID) can be done by use of small thumbswitches in the phone adapter, for example. The LI (length indicator), and HEC (Header Error Control) fields are populated as explained in section 9.1 of I.363.2. The UUI (User-to-User Indication) field is also explained in section 9.1 of I.363.2, and more specifically as detailed in the explanation and references provided in the next paragraphs.

Voice and Voiceband Data Packetization

Digitized voice and voiceband data samples are carried in the payload field of the above AAL2 packet, in what is referred to as "type 1" packets in section 10.1 of I.366.2, and which are identified by the use of the UUI field values of 0–15, as indicated in Table 12-1 of I.366.2.

Various formats and encodings (referred to as profiles) can be used, as summarized in Annex P of I.366.2, and detailed in Annexes A through I of I.366.2. Details of the procedures associated with the profiles are found in sections 13 and 14 of I.366.2.

The following chart, which shows the voice and voiceband data packet format is based on the use of ATM Forum predefined profile 9. This particular profile uses 44 bytes of G.711-64 voice/voiceband data samples, without silence suppression, as shown in Table A-1 of ATM Forum document FB-VMOA-0145.000.

| 8 | 7 | 6 | 5 | 4 | 3 | 2 | 1 | |
|---|---|---|---|---|---|---|---|---|
| OSF |||||| SN | P | 1 |
| value 47 decimal ||||||||
| CID |||||||| 2 |
| LI ||||| UUI ||| 3 |
| value 43 (number of bytes-1:from byte 4 to 48) ||||||||
| UUI (cont) |||| HEC (CRC-5) |||| 4 |
| G.711-64 sample 1 |||||||| 5 |
| G.711-64 sample 2 |||||||| 6 |
| G.711-64 sample 43 |||||||| 47 |
| G.711-64 sample 44 |||||||| 48 |

The following chart, which shows the voice and voiceband data packet format is based on the use of ITU-T predefined profile 1. This particular profile uses 40 bytes of G.711-64 voice/voiceband data samples, without silence suppression, as shown in Table P-1 of I.366.2.

| 8 | 7 | 6 | 5 | 4 | 3 | 2 | 1 | |
|---|---|---|---|---|---|---|---|---|
| OSF |||||| SN | P | 1 |
| value 47 decimal ||||||||
| CID |||||||| 2 |
| LI ||||| UUI ||| 3 |
| value 43 (number of bytes-1:from byte 4 to 48 inclusive) ||||||||
| UUI (cont) |||| HEC (CRC-5) |||| 4 |
| G.711-64 sample 1 |||||||| 5 |
| G.711-64 sample 2 |||||||| 6 |
| G.711-64 sample 39 |||||||| 43 |
| G.711-64 sample 40 |||||||| 44 |
| Pad (0) |||||||| 45 |
| Pad (0) |||||||| 46 |
| Pad (0) |||||||| 47 |
| Pad (0) |||||||| 48 |

Phone Signaling Packetization

Digitized phone signaling is carried in the payload field of the above AAL2 packet, in what is referred to as "type 3" packets in section 10.3 of I.366.2, and which are identified by the use of the UUI field (of the CPS-Packet) value of 24, as indicated in Table 12-1 of I.366.2.

The particular structure of "type 3 packets" are detailed in section 11 of I.366.2. In particular, the message type of "channel associated signaling", whose message type code value is documented in Table 10.1 of I.366.2, and whose detailed format and corresponding procedures are covered in Annex L of I.366.2 must be implemented. The encoding of so called ABCD signaling bits in the "channel associated signaling" messages is made according to the GR-303 states shown in Tables B-1 and B-2 of the ATM Forum document FB-VMOA-0145.000. For the most common type of phones used in residences, the coding corresponding to "Loop Start" signaling type shall be used.

The chart below shows the "Channel associated signaling" message.

| 8 | 7 | 6 | 5 | 4 | 3 | 2 | 1 | |
|---|---|---|---|---|---|---|---|---|
| OSF |||||| SN | P | 1 |
| value 47 decimal ||||||||
| CID |||||||| 2 |
| LI ||||| UUI ||| 3 |
| value 4 (number of bytes-1:from byte 5 to 10 inclusive) ||||||||
| UUI (cont) |||| HEC (CRC-5) |||| 4 |
| Redundancy |||| Timestamp |||| 5 |
| |||||||| 6 |
| RESERVED |||| A | B | C | D | 7 |
| 000011 |||||| CRC-10 || 8 |
| "Channel Associated Signaling" message ||||||||
| CRC-10 (cont.) |||||||| 9 |
| Pad (0) |||||||| 10 |
| Pad (0) |||||||| 11 |
| o |||||||| 12 |
| Pad (0) ||||||||
| o ||||||||
| o ||||||||
| Pad (0) |||||||| 47 |
| Pad (0) |||||||| 48 |

The implementation of message type "Dialled Digits" and "Facsimile demodulation control" which are listed in Table 10.1 of I.366.2 are optional, and necessary only when an encoding profile that does not support transparent transport of DTMF tones is used (typically profiles that use compression below 32 kb/s, since at that level of compression tones used for dialing and in fax machines may not be recognized if simply encoded as "voice" samples). If the "Dialled Digits" message is implemented, the details and corresponding procedures are covered in Annex K of I.366.2. In particular, for phone applications, the digits type of "DTMF" shall be selected. If the "Facsimile demodulation control" message is implemented, the details and corresponding procedures are covered in Annex M of I.366.2.

ALTERNATE EMBODIMENTS

The present invention has been illustrated using phone line adapters that interface to analog telephones. However, the present invention is not limited to use of analog telephones. For example, other devices that interface with analog phone input may be connected to the phone line adapters. For example, fax machines, phone answering machines, and caller id boxes may be connected to a phone line adapter.

Furthermore, the present invention is not limited to phone line adapters that are separate units connected to the analog phone devices. The present invention encompasses any device that is designed to generate packets and interface with a phone line based LAN that supports levels of transmission priority. For example, a phone unit may itself be designed to generate and receive such packets over a phone line based LAN that supports levels of transmission priority. The phone unit may contain components similar to those contained in the phone line adapter, or may be designed in some other way to generate and receive packets containing digital phone data over a phone line based LAN that supports levels of transmission priority. Therefore, it should be understood that the present invention is not limited to phone line adaptors that are external to phone analog device connected to them.

Furthermore, although the description of this invention makes reference, by example, to phoneline priority-based home networks, this is not intended to constrain the present invention to only those networks. In fact the same invention can be used, for example, with powerline priority-based home networks, if such home networks are defined.

Finally, the reference to a home network or residential gateway should also not be construed to limit the present invention scheme to uses in a home or residences. The present invention may be implemented in any structure, be it a residence, an office, or other dwelling, that contains wiring on top of which a priority-based networking scheme may be used.

Network and Computer Hardware Description and Terminology

A computer network typically comprises a plurality of interconnected entities that transmit or receive data frames. A common type of computer network is an LAN that generally comprises a privately owned network within a single building or campus. LANs employ a data communication protocol (LAN standard) such as Ethernet, that defines the functions performed at the physical layers of a communications architecture (i.e., a protocol stack), such as the Open Systems Interconnection (OSI) Reference Model. In many instances, multiple LANs may be interconnected by point-to-point links, microwave transceivers, satellite hook-ups, etc., to form a WAN, metropolitan area network ("MAN") or Intranet. These internetworks may be coupled through one or more gateways to the global, packet-switched internetwork known as the Internet.

Each network entity preferably includes network communication software, which may operate in accordance with Transport Control Protocol/Internet Protocol (TCP/IP) or some other suitable protocol. A protocol generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP which is a reliable, connection-oriented transport protocol. When a process at one network entity (source) wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports (i.e., logical network interfaces ("LI" or "interfaces")) that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which, in TCP/IP networks, corresponds to the Internet Protocol (IP) layer. IP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Figure 3:
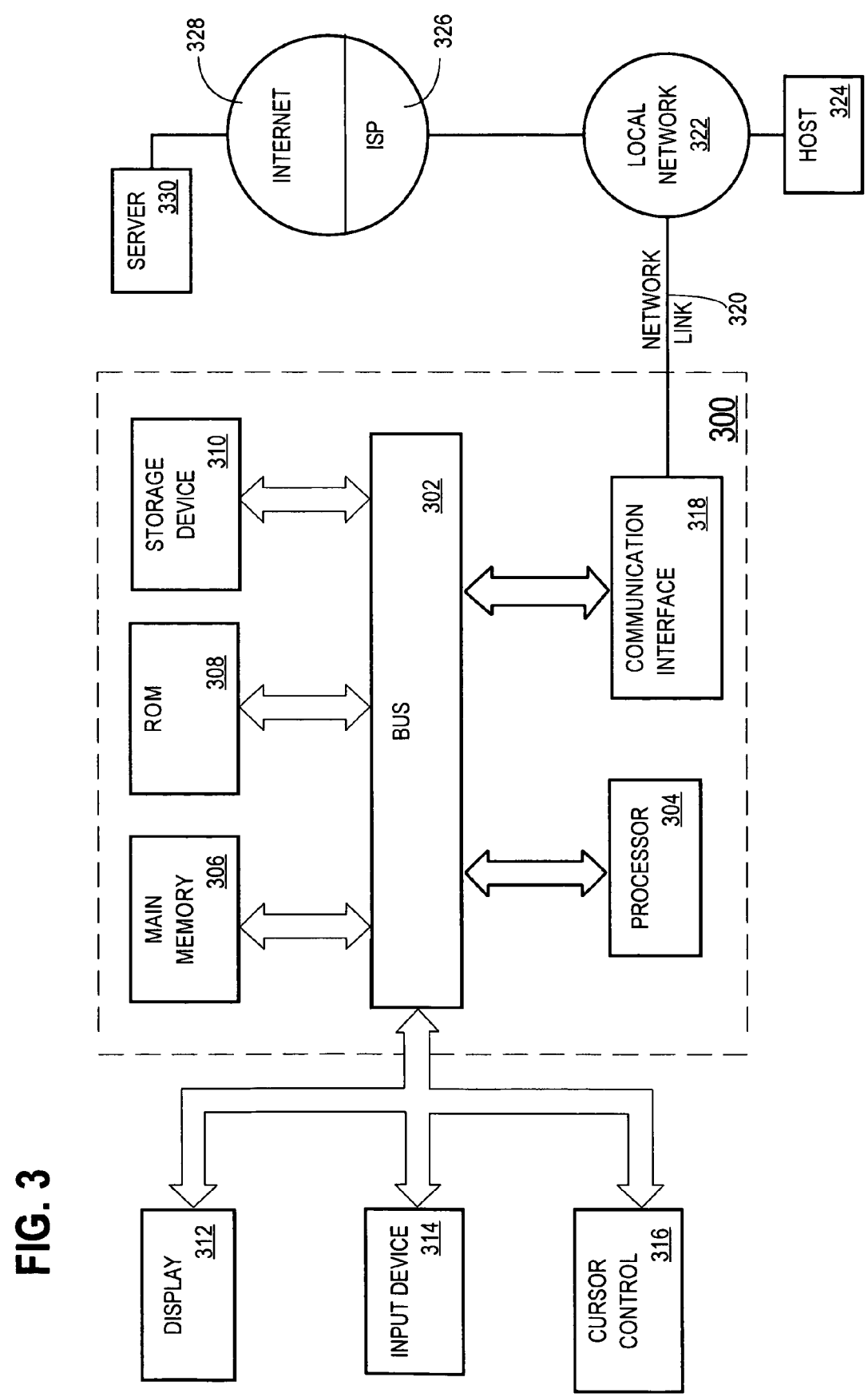
FIG. 3 is a block diagram depicting a computer system.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for transmitting of digitized voice, digitized voiceband data and digitized phone signaling over a priority-based local area network. According to one embodiment of the invention, transmission of digitized voice, digitized voiceband data and digitized phone signaling over a priority-based local area network is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for transmitting of digitized voice, digitized voiceband data and digitized phone signaling over a priority-based local area network as described herein.

The received code may be executed by processor 304 as it is received, and/or stored in storage device 310, or other non-volatile storage for later execution. In this manner, computer system 300 may obtain application code in the form of a carrier wave.

What is claimed is:

1. A method of transporting voice, voiceband data and phone signaling over a network, the method comprising the steps of:
   converting analog phone signals into voice packets for transporting digitized voice, digitized voiceband data and digitized phone signaling, wherein said voice packets conform to a set of protocols that excludes Internet Protocol (IP), and wherein each of said voice packets is an Ethernet packet encapsulating one ATM Adaptation Layer 2 (AAL2) cell;
   setting a field in a frame header of a HomePNA frame that encapsulates each of the voice packets associated with the digitized voice and digitized voiceband indicating that the voice packets are to be transmitted at a highest level of priority of a phone line local area network that supports levels of transmission priority for transmitting data; and
   transmitting said voice packets over the phone line local area network without a separate voice dedicated network and without a logically separate voice network, wherein the voice packets associated with the digitized voice and digitized voiceband are transmitted at the highest level of priority as indicated by the setting of the field in the frame header,
   wherein said phone line local area network follows a HomePNA network protocol.

2. The method of claim 1, wherein the step of transmitting includes transmitting said voice packets over phone line inside wiring in a residence that is connected to one or more analog telephones.

3. The method of claim 1, wherein the steps of converting and transmitting are performed by a phone line adaptor connected to a separate device that transmits said analog phone signals to said phone line adaptor.

4. The method of claim 1, wherein the step of transmitting includes transmitting said voice packets over phone line inside wiring in a residence that is connected to one or more analog telephones and one or more computer devices.

5. A network device that can transmit voice, voiceband data and phone signaling via a network, comprising:
   a Codec configured to receive analog phone signals and generate digitized voice, and digitized voiceband data;
   a Subscriber Line Interface Circuit (SLIC) configured to receive analog phone signaling and generate digitized phone signaling;

a network interface for interfacing to a local area network (LAN) that follows a HomePNA network protocol that supports levels of transmission priority for transmitting data without a separate voice dedicated network and without a logically separate voice network;

said network device configured to generate voice packets that include said digitized voice, digitized voiceband data and digitized phone signaling, by setting a field in a frame header of a HomePNA frame that encapsulates each of the voice packets associated with the digitized voice and digitized voiceband indicating that the voice packets are to be transmitted at a highest level of priority of the local area network, wherein said voice packets conform to a set of protocols that excludes Internet Protocol (IP), and wherein each of said voice packets is an Ethernet packet encapsulating one ATM Adaptation Layer 2 (AAL2) cell; and said network device configured to transmit said voice packets via said local area network, wherein the voice packets associated with the digitized voice and digitized voiceband are transmitted at the highest level of priority as indicated by the setting of the field in the frame header.

6. The network device of claim 5, wherein said LAN uses as a transmission medium phone line inside wiring in a home that is connected to one or more analog telephones.

7. The network device of claim 5, wherein said network device is a phone line adapter configured to receive said phone analog signals from a separate device connected to said phone line adaptor.

8. The network device of claim 5, wherein said LAN uses as a transmission medium phone line inside wiring in a home that is connected to one or more analog telephones and one or more network devices.

9. A network device that can transmit digitized voice, digitized voiceband data, and digitized phone signaling via a network, comprising:

a Codec configured to receive analog phone signals and generate digitized voice and digitized voiceband data;

a Subscriber Line Interface Circuit (SLIC) configured to receive analog phone signaling and generate digitized versions of said analog phone signaling;

a means for interfacing to a local area network (LAN) that follows a HomePNA network protocol that supports levels of transmission priority for transmitting data and that uses inside wiring as a transmission medium without a separate voice dedicated network and without a logically separate voice network;

a means for generating voice packets for transporting digitized voice, digitized voiceband data and digitized phone signaling, by setting a field in a frame header of a HomePNA frame that encapsulates each of the voice packets associated with the digitized voice and digitized voiceband indicating that the voice packets are to be transmitted at a highest level of priority of the local area network, wherein said voice packets conform to a set of protocols that excludes Internet Protocol (IP), and wherein each of said voice packets is an Ethernet packet encapsulating one ATM Adaptation Layer 2 (AAL2) cell; and a means for transmitting said voice packets via said local area network, wherein the voice packets associated with the digitized voice and digitized voiceband are transmitted at the highest level of priority as indicated by the setting of the field in the frame header.

10. A computer-readable medium carrying one or more sequences of instructions for transporting digitized voice, digitized voiceband data and digitized phone signaling over a network, wherein execution of the one or more sequences of instructions by one or more processors causes the one or more processors to perform the steps of:

converting analog phone signals into voice packets for transporting digitized voice, digitized voiceband data and digitized phone signaling, wherein said voice packets conform to a set of protocols that excludes Internet Protocol (IP), and wherein each of said voice packets is an Ethernet packet encapsulating one ATM Adaptation Layer 2 (AAL2) cell;

setting a field in a frame header of a HomePNA frame that encapsulates each of the voice packets associated with the digitized voice and digitized voiceband indicating that the voice packets are to be transmitted at a highest level of priority of a phone line local area network that supports levels of transmission priority for transmitting data; and transmitting said voice packets over the phone line local area network without a separate voice dedicated network and without a logically separate voice network, wherein the voice packets associated with the digitized voice and digitized voiceband are transmitted at the highest level of priority as indicated by the setting of the field in the frame header, wherein said phone line local area network follows a HomePNA network protocol.

\* \* \* \* \*

UNITED STATES PATENT AND TRADEMARK OFFICE
CERTIFICATE OF CORRECTION

PATENT NO. : 6,973,074 B1
DATED : December 6, 2005
INVENTOR(S) : Marcus Maranhao It is certified that error appears in the above-identified patent and that said Letters Patent is hereby corrected as shown below:

Title page, Item [54] and Column 1, line 1,
Title, delete "TRANSMISSION OF DIGITIZED VOICE, VOICEBAND DATA, AND PHONE SIGNALING OVER A PRIORITY-BASED LOCAL AREA NETWORK WITHOUT USE OF VOICE OVER IP TECHNIQUES OR A SEPARATE VOICE-DEDICATED NETWORK" and insert -- TRANSMISSION OF DIGITIZED VOICE, VOICEBAND DATA, AND PHONE SIGNALING OVER A PRIORITY-BASED LOCAL AREA NETWORK WITHOUT USE OF VOICE OVER IP TECHNIQUES AND/OR A SEPARATE VOICE-DEDICATED NETWORK --.

Title page,
Item [56], References Cited, U.S PATENT DOCUMENTS, delete
"5,525,581 A *   6/1996   Hayashi   725/11" and insert
-- 6,526,581      2/2003   Edson     725/11 --.

Signed and Sealed this

Twenty-third Day of May, 2006

JON W. DUDAS
*Director of the United States Patent and Trademark Office*